Feb. 27, 1940.                D. M. ANDERSON                 2,191,703
METHOD AND MEANS FOR ELIMINATING THE WELD LINE DURING THERMOPLASTIC MOLDING
                Filed March 24, 1937          2 Sheets-Sheet 1
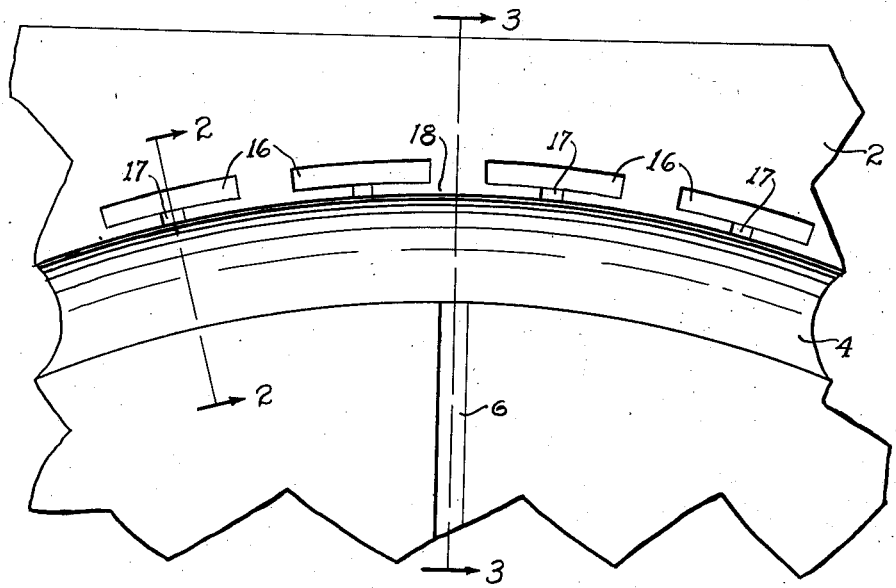
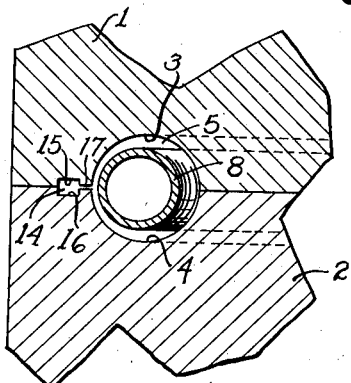
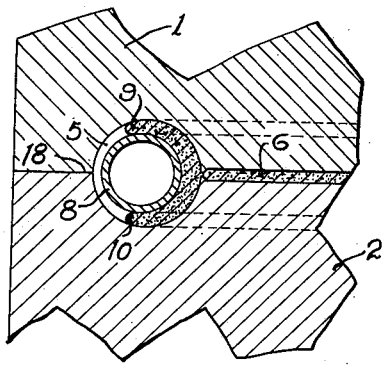
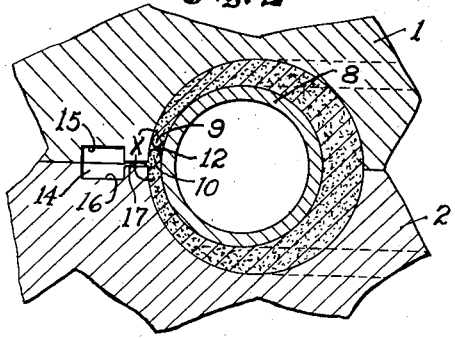
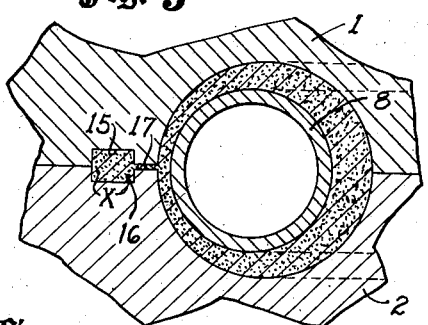
INVENTOR.
DWIGHT M. ANDERSON
BY
                    ATTORNEY.

INVENTOR.
DWIGHT M. ANDERSON
BY John H. Leonard
his ATTORNEY.

Patented Feb. 27, 1940

2,191,703

UNITED STATES PATENT OFFICE 2,191,703

METHOD AND MEANS FOR ELIMINATING THE WELD LINE DURING THERMOPLASTIC MOLDING

Dwight M. Anderson, Cleveland Heights, Ohio, assignor, by mesne assignments, to The Standard Products Company, Port Clinton, Ohio, a corporation of Ohio Application March 24, 1937, Serial No. 132,849

7 Claims. (Cl. 18—42)

This invention relates generally to an improvement in injection type molding and molds for the production of articles having preformed inserts which are covered with a coating of thermoplastic material and more specifically is directed to a method and means for improving the surface appearance of such articles by eliminating the weld line resulting from the meeting of relatively approaching streams of material flowing around the insert in the mold cavity.

In the co-pending application of Harry R. Husted, Serial No. 127,970, filed February 26, 1937, a method and means is disclosed for controlling the zone or position at which the weld line forms by controlling the temperature of the material within the mold. Such a method is particularly applicable to articles having a portion of the surface normally concealed or not readily visible when in use as the weld line can be located in the concealed portion. The present invention, however, is applicable in the manufacture of those articles which must necessarily possess a uniform and neat appearing surface over the entire area and in which it is desirable to eliminate the weld line completely rather than merely to control its position.

The principal objects of the present invention, therefore, lie in the elimination of the usual weld lines from the entire surface of the article and thereby an improvement in the outward appearance thereof, and the provision of a mold for automatically eliminating the weld.

A correlative object is to provide, in such a mold, relief pockets adjacent the mold cavity into which the material which would otherwise form the weld and the material adjacent thereto flows under the injection pressure so that the initially formed weld and resultant line is discharged from the mold cavity and surface of the article.

Another important object lies in the provision of a mold cavity having an insert eccentrically located with respect to the cavity walls or disposed within the cavity to produce a partially restricted passage so that the initial weld line will take place at a predetermined zone in the cavity.

Other objects and advantages will become apparent from the following description and accompanying drawings, in which:

Fig. 1 is a fragmentary plan view of a mold showing the cavity and relief pockets leading therefrom;

Figs. 2 and 3 are fragmentary sectional views through the mold cavity and are taken substantially along lines 2—2 and 3—3, respectively, of Fig. 1;

Fig. 4 is an enlarged fragmentary sectional view similar to Fig. 2, showing the position of the initial weld line;

Fig. 5 is a view similar to Fig. 4 showing the cavity and relief pockets completely filled;

Figure 6:
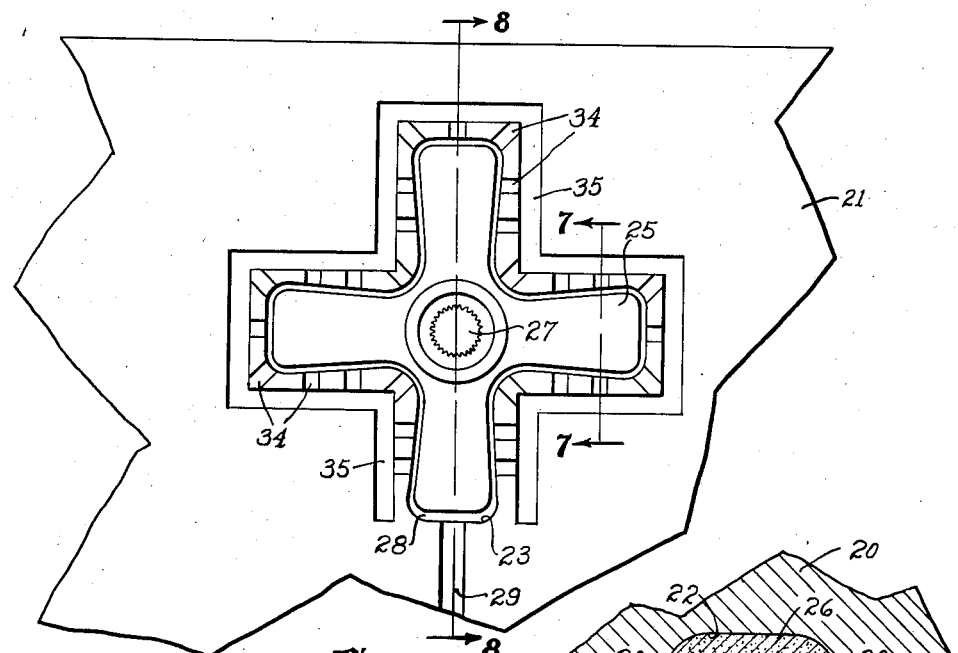
Fig. 6 is a fragmentary plan view of a mold for covering an article of hardware.

For the purpose of illustration, the present invention is shown in conjunction with steering wheels and hardware, such as faucet handles, it being readily apparent that other articles may be made by the same method equally as effectively.

Referring to Figs. 1 to 5, inclusive, the mold is shown comprising an upper mold section 1 and a lower mold section 2, each section having an annular recess 3 and 4, respectively, in the adjacent faces. When the mold sections are in closed position, the recesses 3 and 4 cooperate to define a steering wheel rim cavity 5. A gate 6, which preferably lies parallel to the parting plane of the sections 1 and 2, conducts the thermoplastic material in heated and plastic condition from a pressure source, such as pressure injection cylinders (not shown), to the cavity 5.

An insert 8 which is to be covered with thermoplastic material is held in spaced relation from the walls of the cavity 5 in any well-known manner. It will be noted, however, that this insert 8 is purposely held in an eccentric position with respect to the walls of the cavity 5. This space between the exposed surface of the insert 8 and the walls of the cavity 5 is relatively small adjacent one side of the insert as compared to the space adjacent the diametrically opposite side of the cross section of the insert, as shown in Figs. 2 to 5, inclusive.

In such molding, the material enters the cavity at one side of the insert and flows around the cross section thereof in two oppositely travelling streams. The purpose in deliberately offsetting the insert 8 with respect to the cavity in this manner is to impede the flow of the two streams of thermoplastic material in certain portions of the cavity by partially restricting the space in which the material is moving. By so restricting this space at predetermined zones relative to the insert, it is possible to accurately control the location of the last portion of the cavity to be filled and therefore the location of the weld line.

In the illustrative showing, this restricted space is positioned adjacent the outermost peripheral surface of the steering wheel rim annulus or insert. It will be noted that the gates 6 enter the cavity 5 along the inner periphery of the insert 8 where the space between the insert and the cavity wall is the greatest.

Like all other flowing substances, the thermoplastic material, while being injected under pressure into the cavity 5, inherently follows the path of least resistance, which path is the relatively large annular space around the inner periphery of the insert 8. As the material enters the mold cavity and impinges the insert 8, it divides, as mentioned, into oppositely flowing streams 9 and 10 around the cross section of the insert, as illustrated in Fig. 3. The continued application of pressure on the material in the cavity causes the streams 9 and 10 to progress around the insert 8 with substantially the same velocity toward the more restricted portion of the space until the said streams meet along a line 12 on the peripheral surface of the insert diametrically opposite from the gate and larger spaces, as shown in Fig. 4. This line 12, which in the application above, is defined as the weld line, contains material from both of the streams 9 and 10, and this material, having been the first to enter the cavity and strike the insert, is relatively cooled below the succeeding material. Therefore, the weld is clearly defined because the relatively cooler streams of material will not blend together. For the purpose of description, therefore, a quantity of material adjacent this weld line 12 will be referred to and indicated as X.

Having thus controlled the zone of formation of the weld line 12 by offsetting the insert relative to the cavity walls, the next step is to remove this weld line entirely from the surface of the steering wheel rim or article by forcing the material X, which includes the initial weld line 12, from the cavity 5 under the influence of the high injection pressure.

For this purpose, accumulating pockets 14 are provided in the mold for receiving the material X, the pockets being defined by recesses 15 and 16 in the mold sections 1 and 2, respectively, as indicated in Fig. 5. These pockets are connected to the cavity 5 by short restricted passages 17 which are formed or cut in the land portions 18 of the mold sections bounding the mold cavity.

The pockets 14 may be disposed in spaced relation to each other around the cavity 5, as shown in Fig. 1, or may be continuous, as shown in Fig. 6. It is important, however, that the passages 17 be highly restricted so that the thermoplastic material completely fills the cavity 5 before any appreciable portion of it is forced into the pockets 14.

The passages 17 preferably connect with the cavity at the zone where the space between the cavity walls and the insert 8 is a minimum. It is this zone of minimum space that is the last portion of the cavity to be filled. Consequently, the streams 9 and 10 of material inherently meet to form the initial weld line 12 at a position near the passages 17. Thus, the relatively cooled material X, after the cavity is completely filled, is near the passages 17 so that as the pressure on the material is continued, the material X, which includes the weld line, is forced out of the cavity through the passages 17 and into the pockets 14, as illustrated in Fig. 5, and thereupon the streams of relatively more highly heated and plastic material merge and blend to provide a homogeneous and uniform union free from any appreciable line of demarcation.

In this manner, the surface of the article is entirely free from all apparent cracks, scratches, or lines resulting from the meeting of the approaching streams of material within the cavity. It is important that sufficient pressure be applied to the material after the cavity is completely filled to make certain that the material X is entirely removed from the cavity 5 and is disposed within the pockets 14. If desired, the passages 17 may be so restricted that a higher injection pressure must be applied after the cavity 5 is filled to force the material X into the pockets 14, thus assuring that the cavity 5 is completely filled before the material X is discharged.

The steering wheel is now ready to be removed from the mold cavity, which is accomplished by first separating the mold sections and then ejecting the article in any well known manner. The material which has been forced out of the cavity 5 into the passages 17 and pockets 14 remains integrally attached as an appendage to the thermoplastic coating enveloping the insert 8 and is accordingly removed from the mold concurrently with the steering wheel. These appendages are then sheared or snipped from the rim coating and the surface of the rim then is subjected to a polishing or other suitable finishing operation.

This principle of eliminating the weld line is equally applicable to other articles, such, for example, as the faucet handles illustrated in Figs. 6 to 10, inclusive. In this exemplary showing, a pair of separable mold sections 20 and 21 are each provided with recesses 22 and 23, respectively, which together define the outer surface of a valve handle.

The finished handle comprises an insert or core 25 which is enveloped in a coating 26 of thermoplastic material. The core 25 is held in spaced relation from the walls of the recesses 22 and 23 by a suitable pin 27 associated with one of the mold sections. Thus the insert 25 and the recesses 22 and 23 define a cavity 28 surrounding the insert. The material is conducted from a suitable pressure source, as heretofore described, through a gate 29 into the cavity 28.

It will be noted in Figs. 7 to 10, inclusive, that the cavity 28 is narrower at the zone adjacent the parting plane of the sections 20 and 21 than in any other portion of the cavity. This restricted portion of the cavity is effected by the relative contours of the core 25 and the recesses 22 and 23, and not by offsetting the insert with respect to the cavity, as in the previously described embodiment of the invention.

Figure 7:
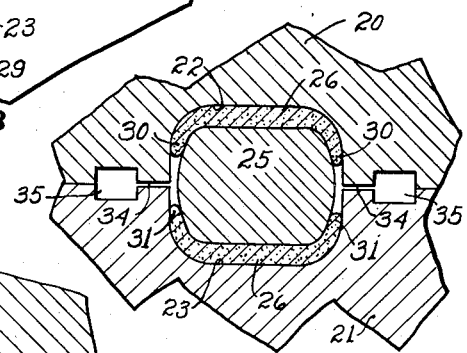
Fig. 7 is an enlarged fragmentary sectional view taken substantially along a plane indicated by the line 7—7 of Fig. 6.
Figure 8:
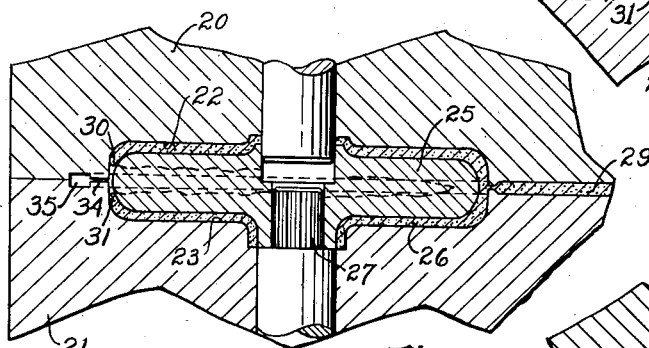
Fig. 8 is a fragmentary sectional view through the mold and insert taken substantially along the plane indicated by the line 8—8 of Fig. 6.
Figure 10:
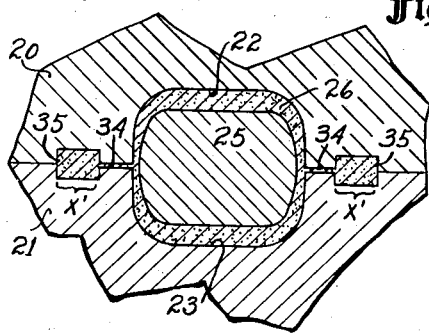
Figs. 9 and 10 are views similar to Fig. 7, showing the various stages of the formation of the coating.
Figure 9:
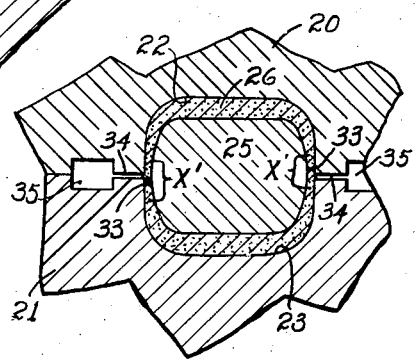

From the description of the characteristics of flow of the material in the cavity 5, it will be seen that the material injected into the gate 29 first fills the largest portion of the cavity 28 which is adjacent the upper and lower sides of the insert 25. This action is best illustrated in Figs. 7 and 8, wherein the material divides into streams 30 and 31. Thus the last portion of the cavity 28 to be filled is that portion which offers the greatest resistance to flow of the material, that is, in the narrowest portion adjacent the parting surface of the sections 20 and 21. In this narrow portion of the cavity 28, the streams 30 and 31 meet to produce a temporary or initial weld line, as shown at 33 in Fig. 9, the material adjacent this weld line hereinafter being referred to as X' for the purpose of description.

The continued application of pressure on the material after the cavity has been completely filled causes the material X' to be forced from the cavity through restricted passage 34 into pockets 35 in the same manner as described above. The material X' carries with it the objectionable weld line 33 so that the surface of the article is free from apparent cracks and scratches produced thereby.

It will be noted that the space between the cavity walls and the portion of the insert 25 adjacent the entrance of the gate 29 into the cavity 28 is relatively large so as not to obstruct or choke the flow of material being injected therein.

After the cavity 28 has thus been filled and the material X', together with the weld line 33, has been forced outside the cavity into the pockets 35, the mold section may be opened and the article ejected therefrom. The excess material formed in passages 34 and pocket 35 which adheres to the coating 26 is sheared or otherwise cut from the coating and the surface of the article subsequently subjected to a finishing and polishing operation, as heretofore described.

From the above description, it will be seen that by providing a choked or restricted portion of a mold cavity adjacent an overflow pocket, an improved surface on the article can be obtained.

Although only a limited number of exemplary embodiments of the present invention have been shown and described, other modifications or adaptations thereof will be apparent to those skilled in the art and may be made without departing from the spirit and scope of the invention as defined in the appended claims.

Having thus described my invention, what I claim is:

1. A mold for forming an article of thermoplastic material comprising separable mold sections having engageable parting surfaces, cooperable recesses in said sections defing a cavity when the mold sections are closed, a gate formed in the parting surfaces and leading to the cavity, means for positioning an insert in the cavity and holding it in spaced relation from the cavity walls so that the space between the insert and cavity walls is relatively large adjacent a portion of the parting surface and adjacent the gate, and merges into a relatively small space adjacent another portion of the parting surface, restricted passages between the mold sections leading from the cavity adjacent the said relatively small space, and accumulating pockets between the mold sections connected to the restricted passages.

2. The method of eliminating the weld line in the molding of thermoplastic material wherein the material in heated and plastic condition is injected into a mold cavity and flows in separate streams which subsequently meet and unite to form an initial weld line at ther juncture and to complete the filling of the cavity, comprising causing the meeting of said streams to occur approximately at a predetermined zone by controlling the rate of flow of the streams, respectively, and, while maintaining the cavity filled with the material and continuously under pressure, discharging a portion of the material including the initially meeting material forming the weld line at the zone of union of said streams through a restricted passage into a pressure tight accumulating pocket and maintaining the material under pressure for an interval after said material is discharged.

3. The method of eliminating the weld line in the molding of thermoplastic material wherein the material in heated and plastic condition is injected into a mold cavity and flows in separate streams which subsequently meet and unite to form an initial weld line at their juncture, comprising causing the meeting of said streams to occur approximately at a predetermined zone by controlling the rate of flow of the streams, respectively, and, while maintaining the cavity filled with the material and continuously under pressure, discharging a portion of the material including the initially meeting material forming the weld line at the zone of union of said streams, increasing the injecting pressure after the formation of the weld line and continuing said pressure during the discharging operation.

4. The method of covering the surface of a preformed article with a coating of thermoplastic material comprising positioning and holding the article in a mold cavity in such a manner as to provide a relatively large space between the surface of the article and the cavity walls at one portion of the cavity and a relatively small space therebetween at another portion of the cavity, injecting the material in heated and plastic condition between the surface of the article and the cavity walls at the larger space, thereby to cause the material to flow around the articles in separate streams which subsequently meet and unite and thereby form a weld line at their juncture and at the zone of the relatively small space, and, while maintaining the cavity filled with plastic material under pressure, discharging a portion of the resulting initially meeting material at the zone of union of said streams into a pressure tight space and restricting the path of flow between the cavity and said space relative to the size of the space.

5. An injection type mold for applying a finishing coating of thermoplastic material to the surface of a preformed core, comprising separable mold sections having recesses cooperable to define a cavity for receiving said preformed core in spaced relation from the walls of the cavity, means for positioning the core in offset relation to the wall of the cavity so as to provide a relatively large space between the core and the wall of the cavity for the major extent of the cavity and a space smaller than the first mentioned space for a minor extent of the cavity, a gate between said mold sections and entering said cavity adjacent the relatively large portion, a plurality of restricted passages between the sections and distributed uniformly around and adjacent said relatively small space and connecting with the said cavity at said small space, and pockets between said mold sections outside of said cavity and connected to said restricted passages.

6. The method of eliminating the weld line in the molding of thermoplastic material wherein the material in heated and plastic condition is injected into a mold cavity and flows in separate streams which subsequently meet and unite to form an initial weld line at their juncture, comprising, providing a mold with a cavity which is progressively and gradually restricted from one portion of the cavity to another portion, injecting the material at said one portion of the cavity and causing it to flow in separate streams from said one portion to said other portion and to tend to meet and unite at a predetermined zone in said other portion, and, while maintaining the cavity of constant size and filled with the material and continuously under pressure, discharging a portion of the material, including portions of the initially meeting material forming the weld line, at the zone of tendency of union of said streams.

7. The method of controlling the position of the weld line of a plurality of converging and meeting streams of thermoplastic material during injection molding thereof about a core, wherein the material is injected in plastic condition into the mold cavity, said method comprising varying the resistance to flow of the material within said cavity at portions of the cavity relative to other portions by a predetermined spacing of wall portions of the core relative to respectively adjacent portions of the cavity wall, so that at a location adjacent the region in which it is desired that the weld line should occur the space between the core and mold wall portions is less than the space between the core and mold wall portions at other regions, and introducing the material into the cavity at a point remote from said desired region of welding.

DWIGHT M. ANDERSON.